(12) United States Patent
Koo et al.

(10) Patent No.: US 9,005,498 B2
(45) Date of Patent: Apr. 14, 2015

(54) METHOD FOR MANUFACTURING SOUNDPROOFING MATERIAL USING POLYURETHANE FOAM FROM CAR SEAT FOAM AND COMPOSITION THEREOF PREPARED THEREBY

(75) Inventors: Hong Mo Koo, Gyeonggi-do (KR); Kyungnam Kim, Seoul (KR); June Ho Yang, Seoul (KR); Young-Tae Kim, Gyeongbuk (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 501 days.

(21) Appl. No.: 13/270,718

(22) Filed: Oct. 11, 2011

(65) Prior Publication Data
US 2013/0009087 A1 Jan. 10, 2013

(30) Foreign Application Priority Data
Jul. 6, 2011 (KR) .................. 10-2011-0067079

(51) Int. Cl.
| | |
|---|---|
| *B29C 70/02* | (2006.01) |
| *B29B 17/00* | (2006.01) |
| *D04H 1/413* | (2012.01) |
| *D04H 1/4266* | (2012.01) |
| *D04H 1/485* | (2012.01) |
| *D04H 1/544* | (2012.01) |
| *B32B 5/00* | (2006.01) |
| *B29K 75/00* | (2006.01) |
| *B29K 105/04* | (2006.01) |

(52) U.S. Cl.
CPC ......... *B29B 17/0042* (2013.01); *B29K 2075/00* (2013.01); *B29K 2105/04* (2013.01); *D04H 1/413* (2013.01); *D04H 1/4266* (2013.01); *D04H 1/485* (2013.01); *D04H 1/544* (2013.01)

(58) Field of Classification Search
USPC .................................... 264/916, 115
See application file for complete search history.

(56) References Cited

U.S. PATENT DOCUMENTS

| | | | | |
|---|---|---|---|---|
| 3,617,417 | A | * | 11/1971 | Olson ........................... 156/181 |
| 4,473,609 | A | * | 9/1984 | Caldwell ....................... 428/141 |
| 4,818,586 | A | * | 4/1989 | Smith et al. ................... 428/198 |
| 5,185,380 | A | * | 2/1993 | Diessel et al. ................. 521/49 |

FOREIGN PATENT DOCUMENTS

| | | |
|---|---|---|
| JP | 2003345363 A | 12/2003 |
| KR | 10-2003-0093823 | 12/2003 |
| KR | 10-0779850 | 11/2007 |
| KR | 10-2009-0018423 | 2/2009 |
| KR | 10-2011-0052413 | 5/2011 |

* cited by examiner

*Primary Examiner* — Matthew Daniels
(74) *Attorney, Agent, or Firm* — Mintz Levin Cohn Ferris Glovsky and Popeo, P.C.; Peter F. Corless

(57) ABSTRACT

Disclosed is a method for manufacturing a soundproofing material by finely crushing a discarded car seat, mixing the crushed car seat with polyester fiber, low-melting polyester fiber such as LM PET, polypropylene fiber and hemp, and carding the resulting mixture, and a soundproofing material composition prepared thereby. The disclosed method allows recycling of polyurethane foam of the discarded car seat into a soundproofing material composition having superior appearance quality and soundproofing performance. The disclosed method also prevents generation of excessive static electricity and allows preparation of a soundproofing material with smooth surface.

5 Claims, 5 Drawing Sheets

| Works | Crushing | Mixing | Carding | Needle punching | Thermoforming & cooling | Heating rolling & cutting |
|---|---|---|---|---|---|---|
| | -Crush PU foam and fibers | -Mix PU with LM fiber, PET fiber and cloth -Use hopper :Uniform particles | -Crush and mix materials → Form web -Repeat carding → Increase mixing ratio | -Punch with needles to fix and mix fibers and PU | -Binding reinforced as the materials and LM fiber is melt -Thermoforming lowers board temperature | -Control thickness using roller -Cut board to predetermined size |
| Photographic images | 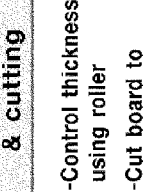 |  |  |  | 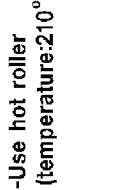 |  |
| Condition | -Mix PU foam with fibers and crush 2 times | -1st & 2nd mixing -Mix PU with LM fiber, PET fiber and cloth | -Card 2 times :Maintain supply amount 1)Feed 160~170rpm 2)Doffer 30~32M/min | -rpm : 500~800 -Depth : 4~10mm | -Use oven upper : 190°C lower : 200°C -Use air cooler cooling temperature : 20~24°C | -Use hot roller (temperature:210°C) |

FIG.2

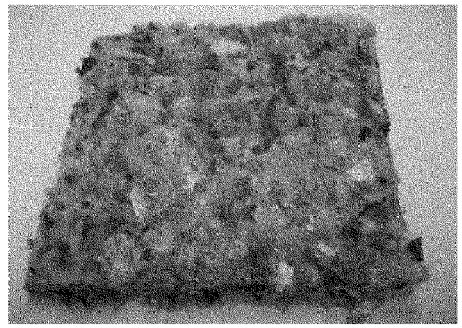
FIG.5
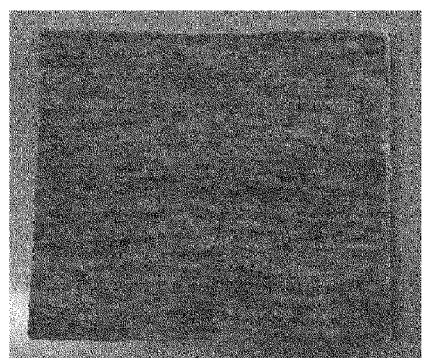
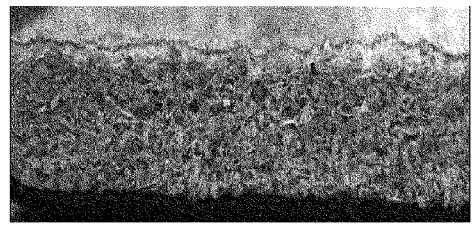
FIG.6

METHOD FOR MANUFACTURING SOUNDPROOFING MATERIAL USING POLYURETHANE FOAM FROM CAR SEAT FOAM AND COMPOSITION THEREOF PREPARED THEREBY

CROSS-REFERENCE TO RELATED APPLICATIONS

This application claims priority under 35 U.S.C. §119 to Korean Patent Application No. 10-2011-0067079, filed on Jul. 6, 2011, in the Korean Intellectual Property Office, the disclosure of which is incorporated herein by reference in its entirety.

BACKGROUND (a) Technical Field

The present invention relates to a method for manufacturing a soundproofing material composition by recycling polyurethane foam in a discarded car seat.

(b) Background Art

In general, a soundproofing material is used in a hood insulation pad or dash insulation pad around a car engine compartment or in interior parts such as the trunk, under the hold or in the dash isolation pad, etc., where soundproofing is required.

As a typical soundproofing material in automobiles, polyethylene terephthalate (PET), fiber materials or urethane foam are frequently used. Car seats, which are usually discarded entirely without recycling, often contain thermosetting polyurethane foam that is used to provide cushion support in the seats. Since the seat foam is composed of a thermosetting material, it is not often recycled but buried underground or incinerated, causing soil and air pollution. However, there is no commercially available method for recycling the polyurethane foam from the discarded seat or for preparing a soundproofing material with satisfactory appearance quality or soundproofing performance for application in car soundproofing parts from the discarded seat foam.

Overseas, Toyota has developed recycled sound proofing products (RSPP) and used them in their automobiles in the Japanese automotive market, Raum, since 2002. However, these soundproofing products are not pure polyurethane (PU) foam but simple chipboard-type products wherein fibers and plastics are mixed. Therefore, they are of very low grade in terms of technique and quality. When considering the overall qualities of these products, including odor, VOCs, density, soundproofing performance and appearance, there is a need in the industry to provide a method for recycling discarded seat foam and producing a high quality soundproofing therefrom.

SUMMARY

The present invention discloses a method for preparing a soundproofing material for an automobile manufactured by recycling discarded car seats through pretreatment, crushing, mixing, etc. In particular, a soundproofing material composition with superior PU foam dispersibility in the soundproofing material as well as superior fineness, soundproofing performance and mechanical properties is provided.

In the present invention, polyurethane (PU) foam is crushed into an adequate size using a cylindrical crusher to ensure uniform dispersibility and smooth product surface while maintaining superior soundproofing performance of PU foam when manufacturing a soundproofing material for use in automobile engine compartment parts (requiring heat resistance and soundproofing performance) or interior parts (requiring soundproofing performance and fire resistance) as well as construction materials.

The present invention provides a method for preparing a soundproofing material composition from discarded car seat foam, which typically would normally cause environmental problems, allowing the car seats to be recycled as soundproofing material and satisfy physical property requirements, by crushing, mixing, carding, needle punching, thermoforming, cooling, heating rolling and cutting the material.

The present invention is directed to providing a method for preparing a soundproofing material composition by adding a new material such as polyester fiber (e.g., PET fiber), low-melting polyester fiber (e.g., LM PET fiber), polypropylene fiber, hemp (e.g., jute), etc. to finely crushed polyurethane foam recovered from a discarded car seat.

In one general aspect, the present invention provides a method for preparing a recycled soundproofing material, including: mixing crushed PU foam recovered from a discarded car seat with polyester fiber (e.g., PET fiber), low-melting polyester fiber (e.g., LM PET fiber) and, optionally, polypropylene (PP) fiber and hemp (e.g., jute) in a mixer, carding, needle punching, thermoforming and cooling the mixture into a felt, and heating rolling and cutting the same. Also, the fiber added to the crushed PU foam during the mixing may be a mixture of PET and LM PET or a mixture of PP fiber and jute.

In addition, a water-injecting spray may equipped to prevent generation of excessive static electricity during the mixing process, and the speed of swinging and processing may be optimized to reduce thickness variation during web stacking of the mixture, and the number and depth of needles, the width and length of a needle frame and the number of punching for needle punching are adjusted to provide smooth surface.

During mixing, PP fiber, hemp (jute) and glass fiber may be added to improve soundproofing performance, physical properties and appearance quality. Further, lamination with a non-woven fabric may be performed to maintain a board shape and prevent separation of the PU foam. The present invention also provides a soundproofing material composition including: (1) 10-80 wt % of crushed discarded seat foam, (2) 10-80 wt % of polyethylene terephthalate (PET) fiber, (3) 2-50 wt % of low-melting polyethylene terephthalate (LM PET) fiber, (4) 2-30 wt % of polypropylene (PP) fiber and (5) 2-30 wt % of hemp (jute), or (1), (2) and (3).

The above and other aspects and features of the present invention will be described infra.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein:

FIG. 2 shows a process for preparing a soundproofing material composition according to an exemplary embodiment of the present invention along with a brief description thereabout;

FIG. 5 shows Toyota's recycled sound proofing products (RSRP);

FIG. 6 shows a soundproofing material prepared by adding 20 wt % of PET fiber and 30 wt % of LM PET fiber to 50 wt % of discarded seat PU foam crushed to 3 mm.

DETAILED DESCRIPTION

Figure 1:
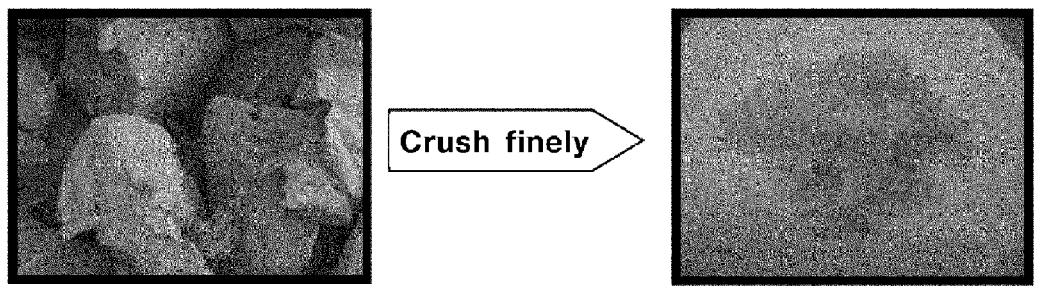
FIG. 1 shows crushed discarded urethane seat foam.
Figure 3:
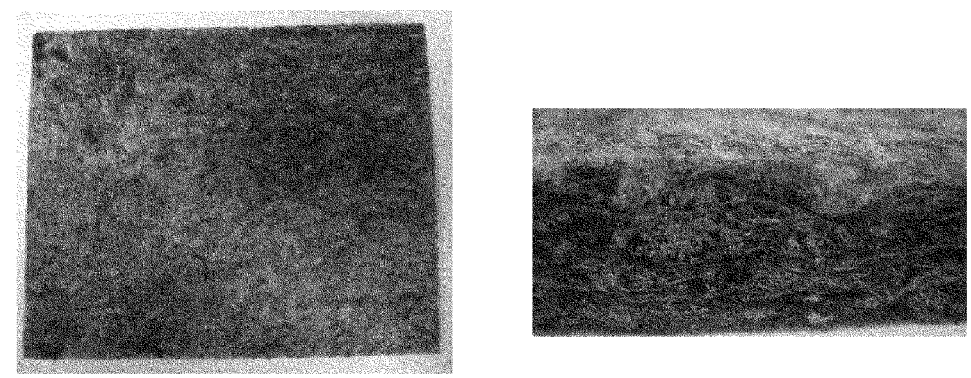
FIG. 3 compares crushing, mixing and carding processes according to the exemplary embodiment of the present invention with those of the existing art.

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a method for preparing a soundproofing material, comprising: (a) finely crushing a discarded car seat; (b) mixing the resulting crushed polyurethane (PU) foam with polyester fiber, low melting polyester fiber, polypropylene (PP) fiber, thermoplastic fiber and hemp; (c) carding the resulting mixture; (d) needle punching the resulting mixture; (e) thermoforming and cooling the resultant; and (f) shaping the resultant into felt and then heating rolling and cutting the same.

In some embodiments of the present invention, the crushed foam may have a size of about 1-15 mm, more specifically about 1-6 mm, most specifically about 2-3 mm. In a specific embodiment of the present invention, the polyester fiber may be polyglycolic acid (PGA), polylactic acid (PLA), polyethylene adipate (PEA), polyhydroxyalkanoate (PHA), polyethylene terephthalate (PET), polybutylene terephthalate (PBT), polytrimethylene terephthalate (PTT) or polyethylene naphthalate (PEN), but is not limited thereto. Most specifically, the polyester fiber may be polyethylene terephthalate fiber.

In some embodiments of the present invention, the thermoplastic may be nylon, acrylonitrile butadiene styrene (ABS), celluloid, cellulose acetate, ethylene vinyl acetate, ethylene vinyl alcohol, polyoxymethylene, polyacrylate, polyamide, polyamide-imide, polyaryletherketone, polybutadiene, polybutylene, polybutylene terephthalate, polycaprolactone, polyethylene terephthalate, polycyclohexylenedimethylene terephthalate, polycarbonate, polyethylene, polyetherimide, polyimide, polylactic acid, polymethylpentene, polyphenylene oxide, polyphenylene sulfide, polyphthalamide, polypropylene, polystyrene, polysulfone, polyurethane, polyvinyl acetate, polyvinyl chloride or styrene acrylonitrile, but is not limited thereto.

In an exemplary embodiment of the present invention, the hemp may be jute, flax (linen), hemp or ramie. In some embodiment of the present invention, the mixture may comprise (1) 10-80 wt % of crushed seat foam, (2) 10-80 wt % of polyester fiber and (3) 2-50 wt % of low-melting polyester fiber. More specifically, the polyester fiber may be PET and the low-melting polyester fiber may be LM PET. Additionally some embodiment of the present invention, the mixture may further comprise (4) polypropylene (PP) fiber and (5) hemp. More specifically, the hemp may be jute. The polypropylene and the hemp may be included in the composition in an amount of 2-30 wt %. More specifically, the polypropylene may be included in an amount of 20-25 wt %, and the hemp may be included in an amount of 10-15 wt %.

In another aspect, the present invention provides a soundproofing material composition prepared by the above preparation method. A description about the composition will be omitted to avoid redundancy.

Hereinafter, the soundproofing material composition recycled from the crushed discarded seat PU foam and the preparation method according to the present invention will be described in detail.

The present invention provides a soundproofing material composition comprising crushed PU foam obtained by crushing a discarded car seat using a cylindrical crusher as main component. The fiber added thereto may be polyethylene terephthalate (PET) fiber, low-melting polyethylene terephthalate (LM PET) fiber or other fiber used to obtain balanced physical properties. Further, glass fiber may also be added. The additives that can be used to improve physical properties and appearance quality of the soundproofing material include PP fiber, jute, glass fiber, etc.

To describe in more detail, the soundproofing material composition comprises PU foam, PET fiber and LM PET fiber as base components as well as 0-40 wt % of PP fiber, jute and glass fiber. Typically, the prepared soundproofing material has a tensile strength of about 7.0 kgf/cm$^2$ in the machine direction and about 20.0 kgf/cm$^2$ in the transverse direction, and soundproofing coefficients of 0.57 at 1.0 kHz, 0.69 at 2.0 kHz and 0.83 at 3.15 kHz. And, a soundproofing board prepared by preheating the prepared soundproofing material between a hot press (about 200-230° C.) for about 30-200 seconds and then forming in a cold mold typically has a fracture strength of about 17.0 kgf/cm$^2$.

Since the PU foam is a thermosetting material that cannot be re-processed with heat or pressure, the foam itself is instead crushed into small sizes (particle size: about 1-10 mm) as shown in FIG. 1. By mixing the crushed PU foam with PET and LM PET fibers, a soundproofing material satisfying physical property requirements and having improved appearance quality can be prepared.

EXAMPLES

The examples and experiments will now be described. The following examples and experiments are for illustrative purposes only and not intended to limit the scope of this invention. A process for preparing a soundproofing material is illustrated in FIG. 2.

Example 1

40 wt % of PU foam was prepared by crushing a recovered discarded car seat into a size of 3 mm was added to 30 wt % of PET fiber and 30 wt % of LM PET fiber. When the additional amount of fibers was increased further, the product appearance was good but lumping of the fibers occurred and the resulting soundproofing material showed relatively poor soundproofing performance as compared to Comparative Example 1.

Example 2

To 50 wt % of PU foam prepared by crushing a recovered discarded car seat into a size of 3 mm, 20 wt % of PET fiber and 30 wt % of LM PET fiber was added. As seen from FIG. 6, the resulting soundproofing material showed uniformly dispersed PU foam and increased amount per unit area. As a result, it exhibited improved soundproofing performance and good appearance.

Example 3

In order to evaluate workability, appearance and soundproofing performance depending on the PU foam size, PU foam was crushed into a size of 6 mm prepared into a soundproofing material in the same manner as in Example 2. As seen from FIG. 4, all of PU foam dispersibility, appearance

Comparative Example 1

For evaluation of applicability of the crushed PU foam, comparison was made with a commercially available soundproofing material (PET 60 wt %+LM PET 40 wt %). Table 1 shows the result of comparing PU foam dispersibility, appearance quality and soundproofing performance.

TABLE 1

Figure 4:
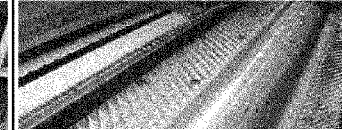
FIG. 4 shows a soundproofing material prepared from 6-mm sized foam particles.
Figure 7:
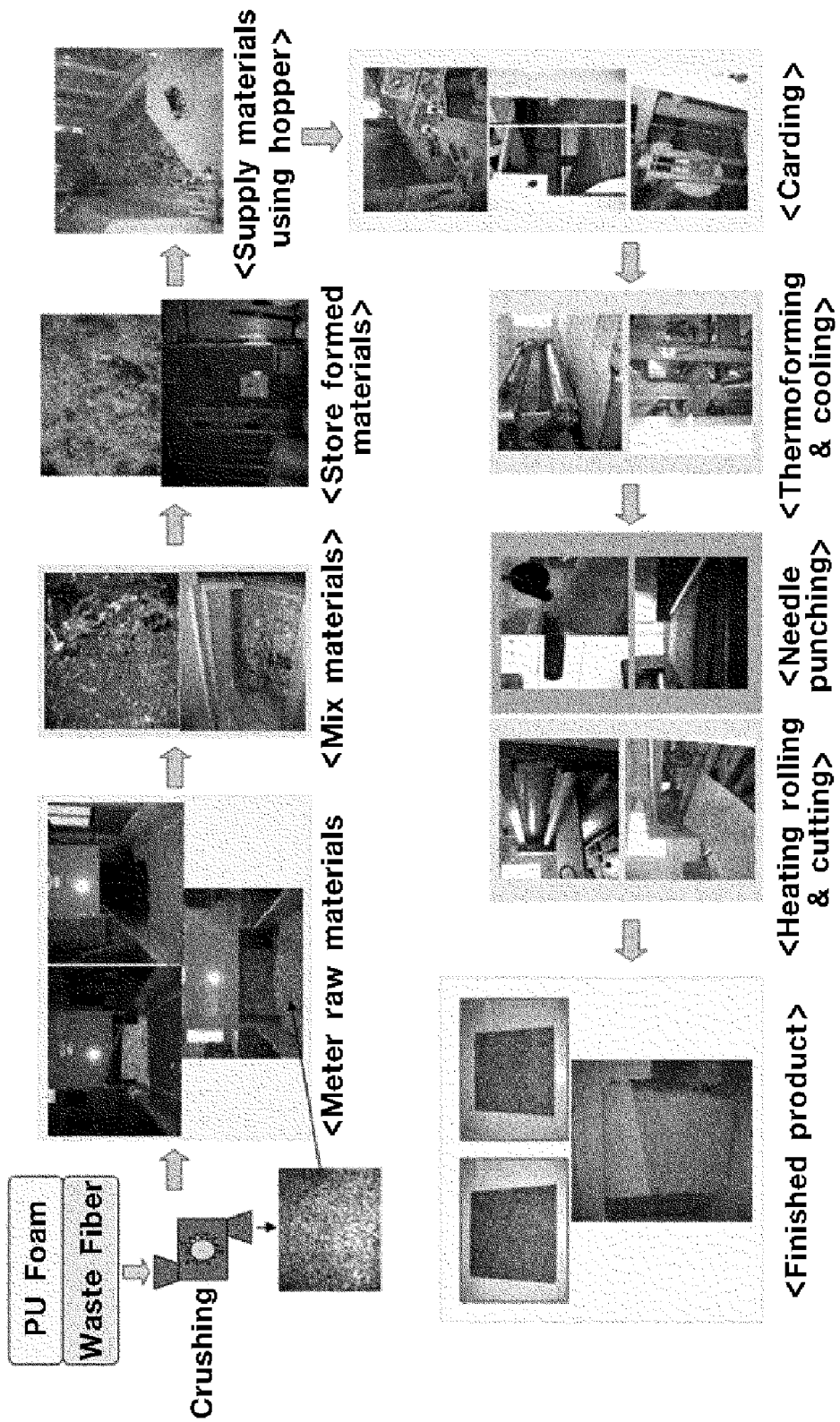
FIG. 7 shows a process for preparing a soundproofing material composition according to the exemplary embodiment of the present invention.

|  |  | Ex. 1 | Ex. 2 | Ex. 3 | Ex. 4 | Ex. 5 | Ex. 6 | Ex. 7 | Comp. Ex. 1 |
|---|---|---|---|---|---|---|---|---|---|
| Crushed PU foam | Content (%) | 40 | 50 | → | → | → | 60 | → | — |
|  | Weight (g) | 400 | 500 | → | → | → | 600 | → | — |
|  | Foam size (mm) | 3 | → | 6 | 3 | → | 3 | → | — |
| PET fiber | Content (%) | 30 | 20 | → | 10 | → | 10 | 30 | 60 |
|  | Weight (g) | 300 | 200 | → | 100 | → | 100 | 100 | 600 |
| LM PET fiber | Content (%) | 30 | 30 | → | 25 | 10 | 30 | 10 | 40 |
|  | Weight (g) | 300 | 300 | → | 250 | 100 | 300 | 100 | 400 |
| PP fiber | Content (%) | — | — | — | — | 20 | — | — | — |
|  | Weight (g) | — | — | — | — | 200 | — | — | — |
| Jute | Content (%) | — | — | — | 15 | 10 | — | — | — |
|  | Weight (g) | — | — | — | 150 | 100 | — | — | — |
| Total | Content (%) | 100 | → | → | → | → | → | → | → |
|  | Weight (g) | 1,000 | → | → | → | → | → | → | → |
| PU foam dispersibility in soundproofing material |  | 4 | 5 | 3 | 5 | 5 | 4 | 4 | — |
| Product appearance |  | 5 | 5 | 2 | 5 | 5 | 5 | 3 | 5 |
| Soundproofing coefficient | 1 kHz | 0.4 | 0.57 | 0.0.48 | 0.59 | 0.60 | 0.59 | 0.60 | 0.49 |
|  | 2 kHz | 0.52 | 0.69 | 0.65 | 0.69 | 0.69 | 0.69 | 0.69 | 0.64 |
|  | 3.15 kHz | 0.71 | 0.83 | 0.75 | 0.83 | 0.82 | 0.83 | 0.82 | 0.77 | and soundproofing performance were unfavorable. The increase in foam particle size resulted in degraded soundproofing performance and appearance with curved surface because of formation of a lot of pores around the dispersed foams (FIG. 4).

Example 4

To 50 wt % of PU foam prepared by crushing a recovered discarded car seat into a size of 3 mm, 10 wt % of PET fiber, 25 wt % of LM PET fiber and 15 wt % of jute was added. The jute was added to reduce cost. The resulting soundproofing material showed comparable results in dispersibility, appearance and soundproofing performance to that of Example 2.

Example 5

To 50 wt % of PU foam prepared by crushing a recovered discarded car seat into a size of 3 mm, 10 wt % of LM PET fiber, 20 wt % of hemp and 20 wt % of PP fiber was added. The addition of the PP fiber having a low melting temperature provided the advantage of lowering the product forming temperature. However, the resulting soundproofing material showed worsened heat resistance than those of Examples 2 and 3. Dispersibility, appearance and soundproofing performance were comparable to that of Example 2.

Examples 6 and 7

To 60 wt % of PU foam prepared by crushing a recovered discarded car seat into a size of 3 mm, 10-30 wt % of PET fiber and 10-30 wt % of LM PET fiber was added. The content of the PU foam was increased as compared to Example 2 in order to increase the recycling amount. However, the increased PU foam resulted in slightly wore dispersibility. When the amount of the binder was insufficient, the product appearance was poor.

(1) PU foam dispersibility in the soundproofing material was evaluated as follows. After cutting the soundproofing material using a knife, the dispersion state of PU foam was visually inspected. The result was evaluated as superior (5), good (4), moderate (3), insufficient (2) or poor (1).

(2) Product appearance was evaluated by visually inspecting the surface curvature of the soundproofing material. In addition, after preheating with a hot press (200-230° C., 1 minute) and then forming in a cold mold, the surface curvature was visually inspected. The result was evaluated as superior (5), good (4), moderate (3), insufficient (2) or poor (1).

(3) Soundproofing performance was evaluated according to the reverberation room method.

In detail, the components of the soundproofing material composition recycled from the crushed PU foam according to the present invention are as follows.

(1) Discarded Car Seat

In the present invention, the polyurethane foam is recovered from a discarded car seat or scrap and crushed finely for recycling. At present, it is rarely recycled but instead is buried underground or incinerated, causing environmental pollution.

(2) Polyurethane (PU) Foam

The polyurethane foam used in the present invention is a thermosetting material, difficult to be recycled unlike thermoplastic materials. It is produced by mixing and blowing polyols with isocyanates. About 10 kg can be obtained from a discarded car. The PU foam is included in the soundproofing material composition in an amount of 10-80 wt %.

(3) Polyethylene Terephthalate (PET) Fiber

The PET fiber used in the present invention has a melting temperature of 250-260° C. and is 2-10 denier (de). With superior mechanical strength and heat resistance, it is used to maintain the shape of the soundproofing material and reinforce heat resistance. The PET fiber is included in an amount of 10-80 wt %.

(4) Low-Melting Polyethylene Terephthalate (LM PET) Fiber

The LM PET fiber used in the present invention has a melting temperature of 130-180° C. and is 3-8 de. It is used to serve as a binder in the soundproofing material. The LM PET fiber is included in an amount of 5-50 wt %.

(5) Polypropylene (PP) Fiber

The PP fiber used in the present invention has a melting temperature of 130-150° C. and is 2-10 de. It is used to serve as a binder in the soundproofing material and to lower the forming temperature by replacing the PET fiber. The PP fiber is included in an amount of 2-30 wt %.

(6) Jute

In the present invention, the jute can be used to provide mechanical rigidity. The jute is included in an amount of 2-30 wt %. In addition to the components (2), (3) and (4) or (2), (3), (4), (5) and (6), a flame-retardant nonwoven fabric may be used depending on purposes.

By providing an applicable method of recycling the discarded car seat into a soundproofing material with superior soundproofing performance, the present invention provides significant cost reduction. Since the discarded car seat would normally be buried underground or incinerated, the present invention allows to improve environment friendliness of automobiles and to meet the international regulations. More specifically, since the soundproofing material composition provided by the present invention exhibits comparable or better performance as compared to the existing soundproofing material comprising 60% of PET and 40% of LM PET, it can save about 15-20% of cost. Additionally, as noted above, it provides benefits to the environmental protection since the discarded car seats can be recycled.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for preparing a soundproofing material, comprising:
    crushing a discarded car seat comprised of polyurethane (PU) foam finely into a size of about 2-3 mm;
    mixing the resulting crushed polyurethane (PU) foam with polyester fiber, low-melting temperature polyester fiber as a binder, polypropylene (PP) fiber, thermoplastic fiber and hemp;
    carding the resulting mixture;
    needle punching the carded material;
    thermoforming and cooling the needle punched material into a felt; and
    hot rolling and cutting the felt,
    wherein the low-melting temperature polyester fiber as a binder has a melting temperature of 130-180° C. and is included in an amount of 2-50 wt %, the polypropylene (PP) fiber is included in an amount of 20-25 wt%, and the hemp is included in an amount of 10-15 wt %.

2. The method according to claim 1, wherein the polyester fiber is selected from the group consisting of polyglycolic acid (PGA), polylactic acid (PLA), polyethylene adipate (PEA), polyhydroxyalkanoate (PHA), polyethylene terephthalate (PET), polybutylene terephthalate (PBT), polytrimethylene terephthalate (PTT) and polyethylene naphthalate (PEN).

3. The method according to claim 1, wherein the thermoplastic fiber is selected from the group consisting of acrylonitrile butadiene styrene (ABS), celluloid, cellulose acetate, ethylene vinyl acetate, ethylene vinyl alcohol, polyoxymethylene, polyacrylate, polyamide, polyamide-imide, polyaryletherketone, polybutadiene, polybutylene, polybutylene terephthalate, polycaprolactone, polyethylene terephthalate, polycyclohexylenedimethylene terephthalate, polycarbonate, polyethylene, polyetherimide, polyimide, polylactic acid, polymethylpentene, polyphenylene oxide, polyphenylene sulfide, polyphthalamide, polystyrene, polysulfone, polyurethane, polyvinyl acetate, polyvinyl chloride and styrene acrylonitrile.

4. The method according to claim 1, wherein the mixture comprises 10-80 wt % of crushed seat foam and 10-80 wt % of the polyester fiber.

5. The method according to claim 1, wherein the polyurethane foam is thermoset polyurethane foam.

* * * * *

UNITED STATES PATENT AND TRADEMARK OFFICE
CERTIFICATE OF CORRECTION

PATENT NO.       : 9,005,498 B2                                    Page 1 of 1
APPLICATION NO.  : 13/270718
DATED            : April 14, 2015
INVENTOR(S)      : Hong Mo Koo et al.

It is certified that error appears in the above-identified patent and that said Letters Patent is hereby corrected as shown below:

Title Page
"Assignees" (item (73)), please add --Kyungbuk Co., Ltd., Gimcheon (KR)--

Signed and Sealed this
Second Day of February, 2016

Michelle K. Lee
*Director of the United States Patent and Trademark Office*